Aug. 7, 1962

M. A. LOGAN 3,048,776

RESISTIVITY MEASURING CIRCUIT

Filed June 8, 1959

INVENTOR
M. A. LOGAN
BY
Charles Scott Phelan
ATTORNEY

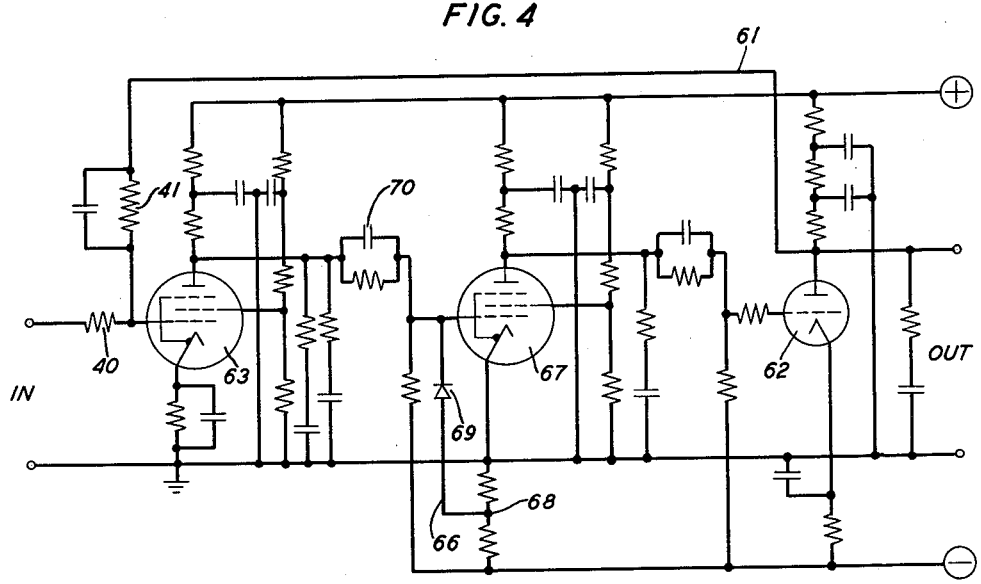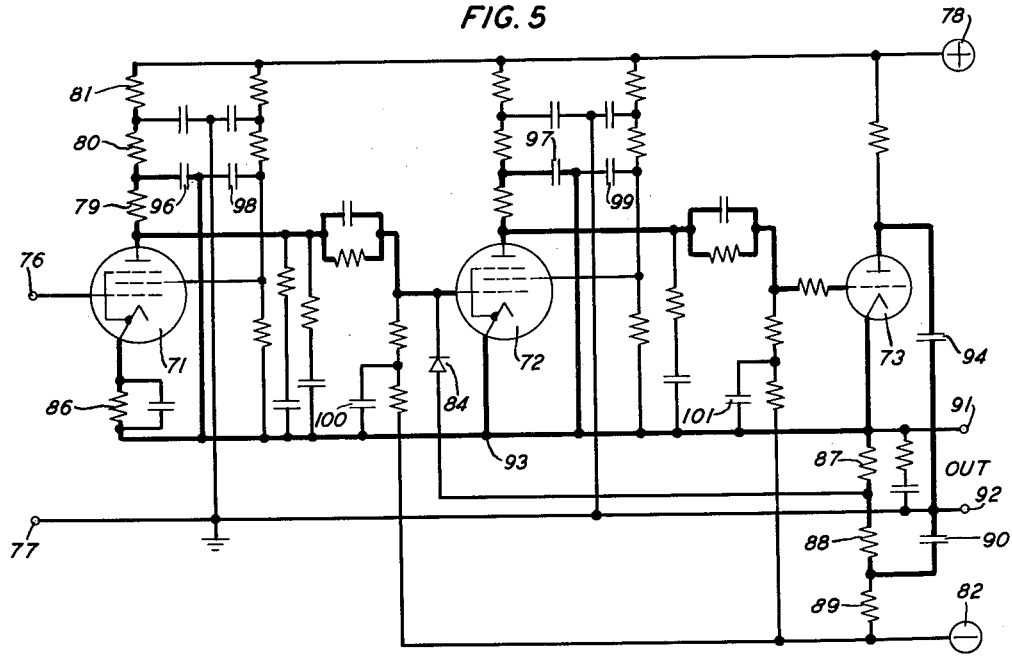

though the invention may be utilized to measure the

United States Patent Office 3,048,776
Patented Aug. 7, 1962

3,048,776
RESISTIVITY MEASURING CIRCUIT
Mason A. Logan, New Providence, N.J., assignor to Bell Telephone Laboratories, Incorporated, New York, N.Y., a corporation of New York
Filed June 8, 1959, Ser. No. 818,620
14 Claims. (Cl. 324—64)

This invention relates to a resistivity measuring circuit and, more particularly, to a circuit for measuring the resistivity of semiconductor material.

During the process of manufacturing semiconductor material, impurities are intentionally introduced into the materials in controlled amounts as is well known in the art. This process is checked by making resistivity measurements on the material to determine its impurity content. The impurity content determines the suitability of the material for a particular application, whether or not a process step has been performed satisfactorily, and the necessary process parameters for subsequent manufacturing operations.

A four-point probe may be employed for making semiconductor measurements which are utilized to determine the resistivity of the material. The use of such a probe is discussed by L. B. Valdes in an article entitled "Resistivity Measurements on Germanium for Transistors" which appears in the February 1954 issue of the Proceedings of the Institute of Radio Engineers. Briefly, the four-probe points are arranged in contacting engagement with the material under test and with the points thereof arranged in some known pattern such as all points lying on substantially the same straight line. Current is applied to the specimen under test via the two end probe points and a voltage drop appears across a portion of the material between the two inner probe points. If the spacing of the two inner probe points with respect to each other and with respect to the other probe points is known, and if the configuration of the specimen under test is known, the resistivity of the material can be calculated.

Prior art measuring methods and circuits for determining resistivity generally involve direct current measurements of the current through a sample and of the voltage drop across a portion thereof. As will be hereinafter described in greater detail, the direct current measuring methods involve factors which inject errors into the resulting data. Some of the sources of error are the contact and thermal potentials at the junction points between the material under test and the probe points, which are generally composed of a substance which is different from the material under test; the junction resistances; the need for a constant direct current source; and the need for at least two meter readings. Accordingly, the accuracy of these direct current methods is not all that might be desired. In the best known prior art circuits for measuring semiconductor resistivity, the spread among a typical series of measurements on a given sample frequently ranges up to 10 percent or more. It is assumed that the errors are random and therefore that the average of all of the readings in the series is the correct reading, but there is no means for demonstrating that the assumption is correct. An improvement in the measuring accuracy would provide more precise control over the entire manufacturing process and would thereby result in a higher yield of useful semiconductor material with the consequent cost savings.

A principal object of the present invention is to improve the accuracy of resistivity measuring apparatus.

Another object is to eliminate certain outstanding sources of error in direct current techniques for measuring the resistivity of semiconductor materials.

Yet another object is to eliminate the need for meter readings in connection with resistivity measuring apparatus.

These and other objects of the invention are realized in an illustrative embodiment thereof wherein the basic test current for measuring semiconductor resistivity is alternating current. The potentials at two terminals of a semiconductor specimen are coupled to the input circuits of separate high input impedance amplifiers which are also characterized by a high degree of linearity. The phase of the potential from one of the two terminals is reversed in a further amplifier; and the two terminal potentials, one being reversed, are combined in a compensated voltage adder circuit with the potential from a calibrated resistance network that is connected in series with the specimen under test. The output of the adder drives a voltage null indicator. When the indicator shows a balance between the potential drops across the specimen and across the calibrated resistor, the resistance of the calibrated resistor is equal to the ratio of potential difference between the terminals to current flowing in the semiconductor specimen. The ratio is utilized to calculate sample resistivity, or the apparatus may be calibrated to indicate sample resistivity directly.

Although the invention may be utilized to measure the resistance of any material, it is herein described in connection with the measurement of semiconductor material resistivity. When a four-point probe is employed, as mentioned previously, the resistance of only a portion of a sample is measured so it is convenient to speak of sample resistivity or of the sample voltage-current ratio, i.e. the ratio of the potential difference between two of the four-probe points to the current flowing in the sample.

One feature of the invention is that the necessity for separate voltage and current readings, and for the corresponding meter calibration requirements and the corresponding dangers of reading error, is eliminated.

Another feature of the invention is that the need for a constant current source is eliminated because changes in current produce equal effects upon the unknown and the calibrated resistances and thus do not alter the null indication.

A further feature of the invention is that the apparatus is easily adaptable for connection in a servo loop to obtain automatic balancing of the potential difference across the unknown and the calibrated resistances.

Yet another feature is the grounding of all principal circuit elements except the probe and the sample.

A still further feature of the invention is that the use of alternating current eliminates substantially all error due to contact potentials and thermal potentials at the probe points.

Other objects, features, and advantages of the invention will be apparent from the following description, including the appended claims, taken together with the attached drawings, in which:

FIGS. 4 and 5 are schematic diagrams of amplifiers employed in the circuit of FIG. 3 to provide exceptionally accurate results in accordance with the present invention.

Figure 1:
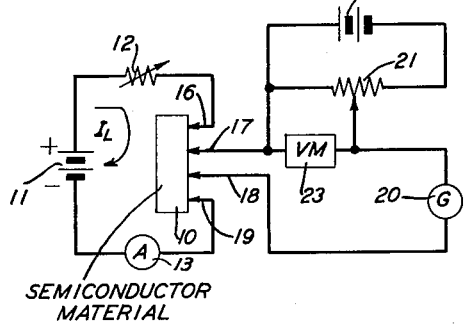
FIG. 1 is a diagram of a prior art measuring circuit.

In FIG. 1 a body of semiconductor material 10 is connected in a series loop circuit with a battery 11, an adjustable rheostat 12, and an ammeter 13. Four probe points 16, 17, 18, and 19 engage the material 10 for making electrical connections thereto. Each probe point forms in the contact area a high resistance that is commonly designated as either the contact or the constriction resistance. In addition, a rectifying junction is formed with certain semiconductor materials. The points 16 through 19 may comprise a four-point probe such as that mentioned in the above-cited Valdes article. Current from battery 11 is applied to the material 10 via the end probe points 16 and 19 and is adjustable in magnitude by means of the rheostat 12. The potential difference across the portion of the material 10 which lies between the inner probe points 17 and 18 is applied to a galvanometer loop circuit which includes a galvanometer 20 and a portion of the resistance of a potentiometer 21. A battery 22 supplies current to the entire resistance of potentiometer 21, and a voltmeter 23 is connected across the portion of potentiometer 21 which is in the galvanometer loop circuit for measuring the voltage thereacross when galvanometer 20 indicates by absence of current flow that such voltage is equal and opposite to the potential drop between probe points 17 and 18. The readings from the voltmeter 23 and the ammeter 13 are utilized to calculate the resistance of the portion of the material 10 between probe points 17 and 18 as hereinbefore mentioned.

Figure 2:
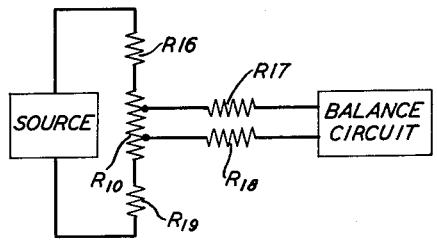
FIG. 2 is an equivalent circuit of a body of semiconductor material and the contact resistances of the probe at the probe junction points.

The equivalent circuit of FIG. 2 shows the electric circuit relationship of the resistance of the material 10 to the resistances of the probe points 16, 17, 18, and 19. In accomplishing a balance as previously described in connection with FIG. 1, direct current flows through the contact resistance $R_{17}$ and $R_{18}$ until a balance is attained. The potential drop which is available to displace the galvanometer pointer to indicate a balance error is reduced by the drop across resistances $R_{17}$ and $R_{18}$. These resistors have such high resistances in certain semiconductor materials that ordinary nonamplifying measuring circuits lack sufficient sensitivity to make precise measurements. An amplifying detector may be employed to overcome the sensitivity problem but such a detector must be operated with one lead thereof at ground potential. If the detector is grounded at the lead which is connected to resistance $R_{18}$, the source of loop current for the semiconductor material must be floated off ground in order to avoid an external shunt path via the resistance between the probe points 18 and 19. Such a shunt path would alter the current distribution in semiconductor material 10 in an unknown manner thereby injecting an additional unknown factor into the measuring problem.

The probe points 16 through 19 are also subject to certain direct current effects among which are contact and thermal potentials; natural instability of the junctions at the probe points which causes the potential thereacross to vary in a random manner with time; and variations in the contact resistances from one body of semiconductor material to another because of factors such as different resistivity of different semiconductor bodies, different amounts of surface contamination, and other different barrier conditions. These effects introduce errors in conventional resistivity measuring circuits. Attempts have been made to reduce at probe points 16 and 19 the effects of fluctuating potentials and of contact resistances by supplying current to the material 10 from a constant current source so that the test current is independent of the various effects at the probe points. However, a constant current source generally includes a leakage path to ground through its power supply. Accordingly, one seeking to make precise measurements of semiconductor material resistivity is immediately confronted with conflicting requirements, i.e. to obtain the desired sensitivity it is desirable to have a grounded detector and a floating source of test current while at the same time to obtain the improvements in accuracy which are due to the use of a constant current source it is necessary to have a grounded source of test current and a floating detector.

Although a constant current source tends to correct the effects of fluctuating potentials and contact resistances at probe points 16 and 19, it does not alter these effects at probe points 17 and 18. Other means are required to meet the requirements of both sensitivity and accuracy with respect to all four probe points.

Figure 3:
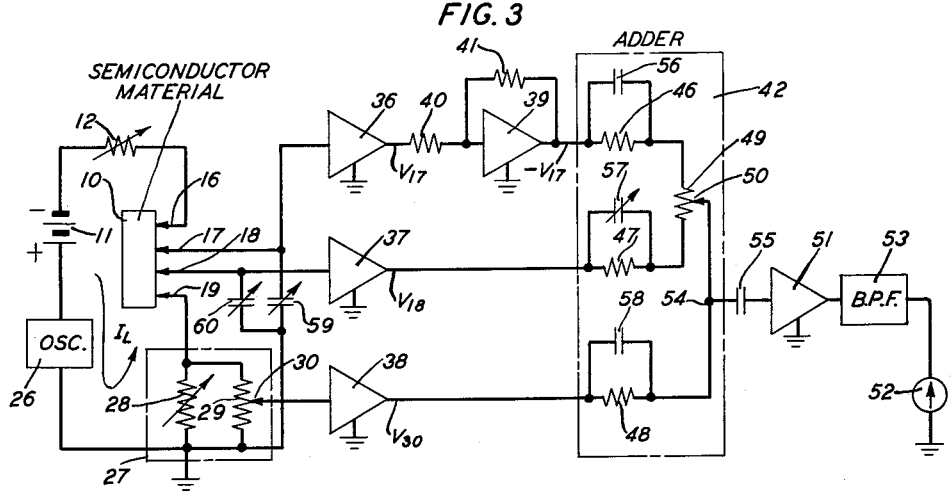
FIG. 3 is a diagram, partially in schematic form and partially in block and line diagram form, of a measuring circuit in accordance with the invention.

Referring to FIG. 3, there is shown in accordance with the invention a circuit in which differential amplification and an alternating source of test current are employed with certain other circuit features to eliminate the conflict between the circuit requirements for sensitivity and accuracy in measuring semiconductor resistivity. An oscillator 26 is inserted in the loop circuit with the semiconductor material 10. The oscillator 26 applies an alternating current to the material 10. A battery 11 may also be included in the aforementioned loop circuit to superimpose a direct current upon the alternating current if desired, but the use of battery 11 is not essential in carrying out the invention. The total current in the loop and in material 10 and network 27 is the current $I_L$. A calibrated resistance network 27 is also connected in the loop circuit which includes the semiconductor material 10. Network 27 comprises a calibrated adjustable resistor 28, which may conveniently be a calibrated decade resistance network, and a calibrated adjustable ratio potentiometer 29 for selecting portions of the voltage drop across the total resistance of the network 27. Potentiometer 29 includes an adjustable tap 30 for selecting the aforementioned portions of the voltage drop across network 27. Potentiometer 29 is calibrated to indicate the ratio to be employed in determining the portion of network 27 having a resistance equal to the voltage-current ratio of the material 10. The voltages at probe points 17 and 18 and at tap 30 are coupled to the input circuits of three amplifiers 36, 37, and 38.

Amplifiers 36, 37, and 38 are nonreversing, negative feedback amplifiers which provide high input impedance to the current loop circuit which includes the material 10 so that substantially no current is diverted therefrom to the amplifiers. The appropriate voltages are, however, readily coupled to the amplifiers. Accordingly, the error introduced in prior art circuits by lack of sensitivity due to the flow of current through the contact resistances $R_{17}$ and $R_{18}$ of FIG. 2 is eliminated. Amplifiers 36, 37, and 38 should include negative feedback means for stabilizing the gain thereof and for improving the linearity thereof to provide accurate transmission of signal voltages therethrough. Since these amplifiers are nonphase-reversing there appear in the outputs thereof the voltages, with respect to ground, $V_{17}$, $V_{18}$, and $V_{30}$ which are the respective voltages at the probe points 17 and 18 and at tap 30. Amplifiers 36 and 37 will generally have the input stages thereof as close to the probe points 17 and 18 as possible in order to reduce parasitic capacities to ground. In addition, a double-shielded cable could be used in a well known manner with the outer shield connected to ground and the inner shield connected to the cathode circuit of the input stage tube of the following amplifier in order to reduce further the capacity in the input of the amplifier.

A fourth amplifier 39 has the input thereof connected to the output of amplifier 36 to reverse the phase of the voltage $V_{17}$. Amplifier 39 is a shunt feedback amplifier having a large negative feedback via a resistor 41 to provide the over-all circuit of amplifier 39 with a high degree of linearity. A resistor 40 connected in series in the input of amplifier 39 determines the ratio between the output voltage and the input voltage (output of amplifier 36) of amplifier 39. The usual relation for the aforementioned ratio is $$\frac{V_o}{V_i} = \frac{R_{41}}{R_{40}} \times \frac{\mu\beta}{1-\mu\beta}$$

where $V_o$ and $V_i$ are the output and input voltages, respectively, of the over-all amplifier, including resistor 41. When the $\mu\beta$ for the amplifier 39 is made large, the voltage ratio is a direct function of the ratio of resistor 41 to resistor 40.

Each of the amplifiers 36 through 39 includes a ground connection that is common to the input and output circuits thereof as schematically indicated in FIG.

3. Each amplifier is also preferably further characterized by a substantially one-to-one transformation ratio between the input and the output voltages, with feedback, since these amplifiers are inserted to perform specific primary functions other than amplification. Amplifiers 36 through 38 are employed as hereinbefore mentioned to provide an extremely high input impedance while at the same time injecting substantially no distortion in the voltages transmitted therethrough. Similarly, amplifier 39 is included in the circuit to provide a phase reversal for the voltage $V_{17}$ without injecting any other distortion in that voltage. Thus, there appears in the output of amplifier 39 a voltage $-V_{17}$ which represents the voltage $V_{17}$ reversed in phase.

The voltages $-V_{17}$, $V_{18}$, and $V_{30}$ are applied to a voltage comparing arrangement which includes an adder circuit 42 and a null detector 52. The three voltages are combined in adder 42 to determine the relative magnitudes of the voltage $V_{30}$ and the voltage difference between voltages $-V_{17}$ and $V_{18}$. Adder 42 comprises in the illustrative embodiment three resistors 46, 47, and 48 connected in series, respectively, with the outputs of amplifiers 39, 37, and 38. A potentiometer 49 has the fixed resistance portion thereof connected between the terminals of resistors 46 and 47 which are remote from their respective amplifiers 39 and 37 for precisely balancing the resistances seen from a tap 50 thereon when looking toward amplifiers 39 and 37, respectively. When these resistances are balanced, the resistance seen from tap 50 to either amplifier 37 or 39 should be equal to the resistance of resistor 48 to an accuracy of one part per thousand. Precision is necessary at this point to insure that only the difference voltage is effective and that the voltage with respect to ground is suppressed. Tap 50 is adjusted to balance the resistances and then locked in position before any measurements are made. The adjustable tap 50 on potentiometer 49 is connected via a junction 54 to the terminal of resistor 48 which is remote from its corresponding amplifier 38.

Junction 54 is connected via a coupling capacitor 55 to the input of an amplifier 51 which amplifies the resultant voltage to a voltage level which is suitable for actuating a null detector 52 which may be, for example, an alternating current, vacuum tube voltmeter or an oscilloscope. Capacitor 55 blocks the aforementioned direct current effects at the probe point so that only alternating potentials are coupled to amplifier 51. A band-pass filter 53 is connected between amplifier 51 and the null detector 52 in order to select only the measuring current frequency and to suppress all other frequencies, including noise outside the pass band thereof, which would otherwise interfere with the null determination on indicator 52. In measuring circuits wherein the frequency of oscillator 26 may be close to the power frequency employed for operating detector 52 the band-pass filter may need to be more precise than a simple filter and may be a device such as a wave analyzer with a band-pass range of 3 or 4 cycles. For example, in some applications the contact resistances $R_{17}$ and $R_{18}$ at the probe points may be of the same order of magnitude with respect to the reactances of the parasitic capacities between ground and probe points 17 and 18 and cause excessive phase shift at the testing frequency. In such situations a lower testing frequency would be employed, and filter 53 may then be a wave analyzer that will block the power supply and noise frequencies and pass the measuring frequency.

For circuits in which a high degree of precision is desired, compensating capacitors may be added. Thus, capacitors 56, 57, and 58 may be connected in shunt with the resistors 46, 47, and 48, respectively, in adder 42 to provide compensation for parasitic capacitances in the circuit wiring. One of these capacitors, capacitor 57 for example, may be made adjustable in order to provide a reactance balance control. In addition, adjustable capacitors 59 and 60 may be connected between probe points 17 and 18, respectively, and ground to provide additional equalization for phase shift which is introduced by parasitic capacity from these probe points to ground. It will be apparent to those skilled in the art that the magnitudes of the capacitors 56 through 60 will be a function of the associated resistances at probe points 17 and 18 and of the degree of measuring accuracy required. Such magnitudes can be determined by well known circuit analysis techniques.

In operating the measuring circuit of FIG. 3 the alternating potential difference voltages between ground and each of the probe points 17 and 18 is coupled via amplifiers 36, 37, and 39 to the adder 42 wherein they are combined with one another. Similarly, the selected portion of the voltage drop across the calibrated resistor network 27 is coupled via amplifier 38 to the adder 42 wherein it is combined with the voltages $-V_{17}$ and $V_{18}$; and the resultant, if any, actuates detector 52. When detector 52 shows that there is no resultant voltage the indicated resistance of network 27 is equal to a resistance corresponding to the ratio of the potential difference between probe points 17 and 18 to the current through material 10 as will be subsequently shown.

In accordance with well known electric circuit theory, the sum of the currents at junction 54 must equal zero at all times. Also, if no current flows in detector 52, junction 54 is a virtual ground potential point. The equation for the null condition which is sought is then:

$$\frac{-V_{17}}{R'_{46}}+\frac{V_{18}}{R'_{47}}+\frac{V_{30}}{R_{48}}=0$$

where $R'_{46}$ and $R'_{47}$ comprise the resistances of resistors $R_{46}$ and $R_{47}$, respectively, together with the portion of potentiometer 49 which is in series with each of them. Since resistances $R'_{46}$, $R'_{47}$ and $R_{48}$ are all essentially equal to one another, the above equation reduces to $V_{30}=V_{17}-V_{18}$, but $V_{30}$ is equal to loop current $I_L$ times $R'_{27}$, the portion of the resistance of network 27 which is indicated at tap 30. Therefore, $$R'_{27}=\frac{V_{17}-V_{18}}{I_L}$$

which is the answer sought in the measurement; but no voltmeter or ammeter readings were required.

In carrying out the above-described operation, a single calibrated resistance such as the decade resistor 28 could be employed with the tap 30 connected directly to probe point 19. However, in such an arrangement the sample current is changed each time that the resistance of resistor 28 is changed. Current changes of large magnitudes in the sample are not desirable, even in the disclosed circuit arrangement, because each change in the voltage with respect to ground of the probe points 17 and 18 changes the magnitudes of the phase shift introduced by parasitic capacitances and requires a further adjustment of the aforementioned compensating capacitors. The use of a single calibrated resistor may, therefore, introduce more effort than is desirable. The combination of the ratio potentiometer 29 with the decade resistor 28 eliminates this difficulty.

In the illustrated arrangement, decade resistor 28 provides a coarse balance adjustment for achieving a balance between the voltages $(-V_{17}+V_{18})$ and $V_{30}$. Resistor 28 is set to a magnitude which is somewhat larger than the resistance magnitude of the sample as indicated by the deflection of the pointer on detector 52. Tap 30 on the calibrated ratio potentiometer 29 is adjusted to obtain a fine balance. When a final balance has been achieved, the total parallel resistance of the network 27 is computed. That total resistance is multiplied by the indicated ratio on potentiometer 29 to determine the selected portion of network 27 having a resistance which is equivalent to the sample voltage-current ratio, i.e. the ratio $$\frac{V_{17}-V_{18}}{I_L}$$

as hereinbefore mentioned. An additional feature of a resistance network such as network 27 is that knowing the probe point spacing and the geometry of the sample, the resistor 28 can be recalibrated so that the calibrated dial of ratio potentiometer 29 will indicate directly the resistivity of the sample material 10.

To accomplish measurements of the sample voltage-current ratio, the resistor 28 is adjusted as hereinbefore mentioned to achieve a coarse balance with tap 30 set at its maximum. Tap 30 is then adjusted downward for fine resistance balance and capacitor 57 is adjusted for reactance balance. If the adjustment range of capacitor 57 is inadequate, a preliminary adjustment of one of the capacitors 59 or 60 may be required. The adjustments of tap 30 and capacitor 57 are refined alternately until an optimum balance condition is obtained; and at that point the resistance of network 27 as indicated at tap 30 is equal to the sample voltage-current ratio, which ratio may be converted to sample resistivity as previously discussed.

The calibration of the circuits of FIG. 3 may be readily checked before measurements are conducted. To check the resistance calibration, the leads for probe points 16 and 17 are connected together, and the leads for probe points 18 and 19 are connected together. A precision, wire wound resistor of known resistance is connected between the leads for voltage probe points 17 and 18 with the probes removed, and the circuit is balanced as hereinbefore described. At balance, the resistance indicated by network 27 should be equal to the resistance of the precision resistor.

To check the linearity of amplifiers 36 and 37, tap 30 is adjusted to ground so that the indicated resistance of network 27 at tap 30 is zero. The aforementioned interconnections between probe points are removed. Now the leads for the probe points 16 through 18 are connected together and to one terminal of a source of alternating voltage of, for example, 3 volts. Tap 50 is adjusted to balance the outputs of amplifiers 39 and 37. Detectors 52 should indicate voltage balance. The oscillation amplitude is then decreased toward zero; and if the amplifiers are operating in a linear fashion, the balanced indication will not change.

As hereinbefore mentioned, a direct current from battery 11 may be superimposed upon the alternating current from oscillator 26. The use of a superimposed direct current permits incremental resistivity measurements at different current levels.

If the probe points 16 and 19 form rectifying junctions with material 10, they are alternately reversely biased by the output of oscillator 26; and the loop current $I_L$, therefore, remains sinusoidal. However, the voltage to ground at probe points 17 and 18 has a rectified wave form due to the rectification at point 19. The half-wave rectified voltage to ground includes harmonics that react with the parasitic capacities at probe points 17 and 18 to produce large currents in resistances $R_{17}$ and $R_{18}$ which in turn develop potentials that cause amplifiers 36 and 37 to see a distorted version of the potentials in material 10 at probe points 17 and 18. The distorted voltage changes constitute an error in themselves and they also can make a sufficient alteration in the direct current operating level in the inputs of amplifiers 36 and 37 on each cycle to drive the amplifiers out of the linear portions of their operating characteristics thereby injecting additional error. If the superimposed direct current from battery 11 is of a polarity which tends to forward bias probe point 19 and of a magnitude which is greater than one-half of the peak-to-peak alternating current amplitude, there will be no current reversals at probe point 19; and the error-causing rectification in the voltages to ground from probe points 17 and 18 is eliminated.

Separate amplifiers have been shown in FIG. 3 to indicate the various amplification functions. The circuit can be simplified by combining some of the functions and still retain many of the benefits of an alternating current measuring system. For example, a conventional, cathode-coupled, differential amplifier could be employed in place of the indicated amplifiers 36, 37, and 39. The advantage of having substantially all of the principal circuit elements, except the sample and the probe points, grounded would be retained; the advantage of having an alternating current system would be retained; and the advantage of having substantially no current flowing in the contact resistances of the probe points 17 and 18 would also be retained. However, it has been found that the conventional cathode-coupled differential amplifier, which includes two input grids for receiving the two signal voltages, two separate anode load circuits, and a common cathode resistance, produces certain errors which should be avoided in order to obtain the utmost in precision.

A conventional cathode-coupled differential amplifier of the type mentioned above does not have the high degree of negative feedback which is necessary to provide the high degree of linearity that is desirable for making precise measurements. In addition, such a differential amplifier injects into its output an error which may amount to as much as several percent of the ultimate measured resistance. This error arises from the fact that the cathode voltage of the circuit is a function of the average of the two input voltages and causes to be produced in the anode circuit of each tube a nonamplified error signal which is approximately equal in magnitude to the average input signal magnitude. This error signal is in addition to the amplified difference signal. An error of that size would not permit measurements of sufficient accuracy to realize an improvement in the control of manufacturing processes, but it may be tolerable in other applications. For maximum accuracy it has been found to be desirable to employ separate reversing and nonreversing amplifiers as described in connection with FIG. 3.

In order to realize an improvement in the control of the semiconductor manufacturing process a measuring accuracy of about 0.5 percent is required for the over-all measuring system. This means that each circuit in the system must have an accuracy of about 0.1 percent. In a typical measuring problem the voltage between ground and either of the probe points 17 and 18 would be of the order of one volt while a typical voltage between these probe points would be about one millivolt. Thus the differential amplifier, if one were used, must couple the one-volt-magnitude voltages at probe points 17 and 18 to the adder 42 with a relative accuracy of one part per million in order that the millivolt difference between the probe points may be identified with an accuracy of 0.1 percent, one microvolt. In other words the linearity characteristics of the coupling to each of the probe points 17 and 18 must be parallel to a microvolt accuracy. The conventional cathode-coupled differential amplifier is not that good.

Referring to FIGS. 4 and 5, there are shown circuits for the reversing amplifier 39 and for the nonreversing amplifiers 36, 37, and 38 which have been found to amplify with a relative accuracy of approximately one part per million. Amplifier 36 is shown in FIG. 5, but the amplifiers 37 and 38 are identical to amplifier 36. In describing the circuits of FIGS. 4 and 5, it is to be understood that the unnumbered circuit elements are conventional elements, such as coupling capacitors, decoupling networks, load resistors, by-pass capacitors, bias networks, frequency cut-off networks, and the like, and these will not be further described.

The circuit of FIG. 4 is a three stage voltage amplifier with an internal amplification of approximately 100,000 without feedback. This high amplification makes the loop gain for the amplifier sufficiently high that it is independent of amplifier characteristics and depends almost entirely upon external circuit elements in a well known manner. A negative feedback connection 61, including feedback resistor 41, couples the output signal at the anode of the output stage triode 62 to the control grid of the input stage pentode 63 in a shunt feedback connection. The over-all gain of the amplifier is fixed at unity by selecting feedback resistor 41 and input resistor 40 with equal resistances. The strong negative feedback gives the three stage amplifier the desired high degree of linearity; maximum distortion is about one part per million.

An antilock-up circuit 66 is connected between the control grid of the intermediate stage pentode 67 and a negative potential junction 68 having a potential magnitude slightly greater than the normal negative grid bias on the pentode 67. The antilock-up circuit 66 also includes a diode 69 which is poled for conduction toward the control grid of pentode 67. The purpose of the antilock-up connection 66, including diode 69, is to provide symmetrical behavior to either polarity and to prevent an abnormal charge from being developed in capacitor 70, by a transient overload of the amplifier, such as always occurs when power is applied to the circuit. For a large impulse of either polarity, either the grid of pentode 67 or the diode 69 conducts and clamps the potential on capacitor 70 to a value close to its normal value. Upon removal of the transient, the small correction to the charge on capacitor 70 can be made promptly and the circuit stabilized. It has been found that an additional antilock-up device is not necessary in connection with the control grids of triode 62 and pentode 63.

The three stage nonreversing amplifier of FIG. 5 is actually a modified cathode follower arrangement employing three amplifier tubes 71, 72, and 73. The input pentode tube 71 has one amplifier input terminal 76 connected to the control grid thereof. Another input terminal 77 for the amplifier is connected to ground. The anode of tube 71 is connected to the positive terminal 78 of a source of operating potential (not shown) via the series-connected resistors 79, 80, and 81. The cathode of tube 71 is connected to a negative terminal 82 of the same source of operating potential via the series-connected resistors 86, 87, 88, and 89. The mid-point of such source is, of course, grounded. Resistor 89 is a decoupling resistor and co-operates with a decoupling capacitor 90 which is connected between ground and the common terminal of resistors 88 and 89. Resistor 86 is a by-passed cathode self-bias resistor. Resistors 87 and 88 comprise cathode follower load impedances. Output terminals 91 and 92 for the amplifier are connected to a terminal 93 which is common to resistors 86 and 87 in series with resistor 88 and to ground, respectively.

Thus, the input stage of the amplifier of FIG. 5 has a cathode follower type of input circuit with the input signal applied thereto between the control grid and cathode of the amplifier tube and with the signal input circuit including capacitor 90 and resistors 87 and 88. The output for the entire amplifier is derived across the same impedances which were included in the signal input circuit, namely the resistors 87 and 88 and the decoupling capacitor 90. The purpose of the resistor 87 is to provide a small negative potential to back bias diode 84 in an antilock-up circuit as was done for diode 69 in FIG. 4.

It is well known that in cathode follower circuits the ratio of output voltage to input voltage is usually somewhat less than unity. In order to compensate for this factor and to provide a ratio which is much more nearly equal to unity, two additional stages of amplification are included in the cathode follower circuit of FIG. 5. These stages include the pentode tube 72 and the triode tube 73. For this purpose a second signal output circuit is connected to amplifier tube 71 at the anode thereof and at the terminal 93 in the cathode circuit thereof. The last-mentioned output circuit is coupled to the input of tube 72 between the control grid and cathode thereof via a resistance-capacitance interstate coupling network. The output of amplifier tube 72 between the anode and cathode thereof is coupled in a similar manner to the input of tube 73 between the control grid and cathode thereof. The output circuit of tube 73 is connected between the anode and cathode thereof and includes in series a capacitor 94, the decoupling capacitor 90, and the aforementioned resistors 87 and 88.

In addition, the anode currents of the three stages are diverted to their respective cathode circuits in order to bring the gain of the three stages together up to a point that would provide a ratio of output voltage to input voltage that is sufficiently close to unity. These current diverting circuits comprise primarily the capacitors 96, 97, and 94 in series with capacitor 90. Capacitors 96 and 97 divert signal currents from the anode circuits of tubes 71 and 72 to the individual cathode circuits thereof. Capacitor 94 in series with capacitor 90 similarly diverts signal currents from the anode of tube 73 to the cathode thereof via the aforementioned cathode follower load impedances. Capacitors 98 and 99 also connect the screen grids of tubes 71 and 72 to the individual cathodes thereof to supplement the diverted current effect. This effect is further supplemented by decoupling capacitors 100 and 101 which connect the control grid bias circuits of tubes 72 and 73 to the individual cathode circuits thereof.

From the above description it will be seen that the resistors 87 and 88 and the capacitor 90 are common to the signal input circuit of tube 71 and to the signal output circuit of tube 73; but they are not included in the signal input circuit of tube 73, in either the signal input or the signal output circuits of tube 72, or in the signal output circuit of tube 71. In this manner the cathode follower load impedances are provided with amplified current from the amplifier tube 73 which flows in the aforementioned common impedances and tends to enhance the degenerative nature thereof to a much greater extent than in a single-stage cathode follower circuit. Accordingly, it is possible with the circuit of FIG. 5 to meet the linearity requirement of one part per million accuracy.

While this invention has been demonstrated by illustrating the application thereof to particular circuit embodiments it is to be understood that these are in no way limiting upon the invention and that other embodiments which will be obvious to those skilled in the art are included within the spirit and scope of the invention.

What is claimed is:

1. A circuit for measuring with a high degree of precision the resistivity of a body of semiconductor material, said circuit comprising a source of electrical oscillations having one terminal thereof grounded, said body of semiconductor material, a calibrated adjustable resistor having one terminal thereof grounded, means connecting said material and said resistor in series between the terminals of said source, a voltage comparator, grounded coupling means with an input impedance substantially higher than said resistivity of coupling the voltage difference across at least a portion of said material to said comparator, grounded means for coupling the voltage difference across said calibrated resistor to said comparator, and a grounded indicator in said voltage comparator for continuously indicating whether or not voltages applied to said comparator from said coupling means are of equal magnitudes.

2. A resistivity measuring circuit comprising a source of alternating potential, a source of direct potential, an unknown resistance, a calibrated resistance, means for connecting said resistances and said source of direct potential in series between the terminals of said source of alternating potential, a voltage comparator for producing an output voltage which is a function of the difference between the magnitudes of two input voltages, two electric contacts engaging said unknown resistance and forming shunt branches of a π-network having said unknown resistance in the series branch thereof, said series branch having a much lower resistance than either of said shunt branches, means having a unity voltage transformation ratio for coupling the potential drop between said contacts to a first input circuit of said comparator, the last-mentioned means having sufficiently high input impedance to prevent substantially all current flow thereinto in shunt of said unknown resistance, and means for coupling the potential difference across said calibrated resistance to a second input circuit of said comparator.

3. A circuit for precisely measuring the resistivity of a body of semiconductor material, which circuit comprises a source of voltage oscillations having one terminal thereof grounded, said semiconductor material, probe means engaging said material and including four probe points arranged in predetermined spatial relationship with one another, each of said probe points forming with said material a rectifying junction, calibrated resistance means having one terminal thereof grounded, a source of direct potential, means including two of said probe points for connecting said calibrated resistance means and said material in a series current loop with said source of voltage oscillations and said source of direct potential, said direct potential source being poled to tend to forward bias the probe point which is closest in said loop to the ungrounded terminal of said calibrated resistance means, a voltage comparator for producing an indication which is a function of the net alternating input potential applied thereto, means responsive to voltages at the remaining two of said probe points for coupling the potential differences with respect to ground at each of them to a different input of said comparator, and means for coupling the potential difference across said calibrated resistance means to another input of said comparator.

4. A resistivity measuring circuit which comprises a body of semiconductor material of unknown resistance, a source of alternating current, calibrated resistance means which includes a decade adjustable resistor, and a ratio resistor connected in parallel with said decade resistor and having an adjustable tap thereon, means for connecting said calibrated resistance means and said semiconductor material in series between the terminals of said alternating current source, a voltage comparator for producing an output voltage which is a function of the net input potential applied thereto, means for continuously coupling the potential difference across at least a portion of said semiconductor material to one input of said voltage comparator, said coupling means being characterized by constriction resistances in the region of engagement with said material which are much higher than the resistance of said portion, and means for continuously coupling the voltage at said tap to a second input of said comparator, both of said coupling means having input impedances of sufficient magnitude so that substantially no current is diverted thereby from said series connection.

5. A circuit for measuring the resistivity of a body of semiconductor material through which an alternating current is flowing, said circuit comprising probe means engaging said material and including at least two probe points lying on a common line in a predetermined spaced relationship with respect to one another, calibrated resistance means connected in series with said semiconductor material to receive said alternating current, a voltage comparator having plural input connections and means for continuously indicating whether or not the voltages at said input connections are balanced, amplification means with high input impedance and responsive to the current in said semiconductor material for actuating said comparator in response to the alternating potential difference between said two probe points, means for coupling the potential difference across said calibrated resistance means to another input of said comparator, and means for adjusting said resistance means to produce a voltage balance indication in said comparator.

6. A resistance measuring circuit which comprises a source of alternating current, a body of semiconductor material, probe means engaging said material and comprising four probe points lying in the same plane, said points being spaced a predetermined distance from one another, calibrated resistance means, means including the two outer ones of said probe points for connecting said resistance means and said material in series between the terminals of said source, three high input impedance non-phase-reversing amplifiers having the inputs thereof connected respectively to the two inner ones of said probe points and to said calibrated resistance means, a phase-reversing amplifier having the input thereof connected to the output of one of said non-reversing amplifiers which is connected to a probe point, voltage adding means for combining the output voltage of said reversing amplifier with the output voltages of the two remaining nonreversing amplifiers, a voltage null indicating device connected to the output of said adder, and means for adjusting said calibrated resistance means to obtain a null indication on said device.

7. The resistance measuring circuit in accordance with claim 6 in which said adding means comprises three separate resistors each being connected in series with the output of a different one of said reversing amplifier and said two remaining nonreversing amplifiers, a resistor having an adjustable intermediate tap and having the terminals thereof connected respectively to the two of said series resistors which are in the output of said reversing amplifier and in the output of the nonreversing amplifier which is connected to the remaining one of said inner probe points, and means for connecting said tap and the third one of said series resistors to the input of said null indicating device.

8. The resistance measuring circuit in accordance with claim 7 in which three compensating capacitors are connected in shunt, respectively, with different ones of said series resistors, two additional compensating capacitors are connected respectively between different ones of said inner probe points and ground, and a band-pass filter having minimum attenuation in a frequency range which includes the frequency of said source of alternating current is connected between said voltage adder and said null indicating device.

9. A circuit for measuring the voltage-current ratio of a body of semiconductor material, said circuit comprising said body of semiconductor material, a source of alternating current having one terminal thereof grounded, calibrated resistance means having one terminal thereof grounded, means connecting said calibrated resistance means in series with said semiconductor material between the terminals of said source, a voltage comparator having at least three input terminals and means for indicating whether or not the total input terminal voltage is zero, said indicating means having one terminal thereof grounded, a plurality of high-input impedance nonphase-reversing amplifiers each having an input circuit, an output circuit, and a ground connection which is common to said input and output circuits, a first and a second of said amplifiers having an ungrounded terminal in the input of each of them connected to a first and a second terminal of said material, respectively, a third one of said amplifiers having an ungrounded terminal in the input thereof connected to an intermediate terminal of said calibrated resistance means, a phase-reversing amplifier having an input circuit, an output circuit and a ground terminal common to its input and output circuits, means connecting the output of said first amplifier to the input of said phase-reversing amplifier, each of said amplifiers having a substantially unity transformation ratio of output voltage to input voltage, means for connecting an ungrounded output terminal of each of said reversing amplifier and said second and third amplifiers to said three comparator input terminals, and means for adjusting said intermediate terminal of said calibrated resistance means for obtaining a zero voltage indication in said comparator, the resistance of said resistance means at said zero voltage indication being equal to said material voltage-current ratio.

10. The measuring circuit in accordance with claim 9 in which a probe having four points engaging said material is provided for connecting said material in said measuring circuit, said points being arranged in predetermined spatial relationship with one another and forming individual rectifying junctions with said material, two of said probe points being connected in said series circuit with said resistance means and said source, the remaining two of said points comprising said first and second terminals of said material, said resistance means comprises a calibrated adjustable resistance, a calibrated ratio potentiometer having the fixed resistance portion thereof connected in parallel with said adjustable resistance, and an adjustable tap on said potentiometer comprising said intermediate terminal, each of said first, second, and third amplifiers comprising three vacuum tube amplifier stages including at least a cathode, an anode, and a control grid, an input circuit connected between the control grid and cathode of a first one of said stages and including an impedance connected between the grounded terminal of such input tube thereof, means for connecting said amplifier output circuit across said impedance, a signal output circuits for said first stage comprising means for coupling the anode and cathode of said first stage to the control grid and cathode, respectively, of a second stage, signal coupling means connecting the anode and cathode of said second stage to the control grid and cathode of a third stage, said third stage having a signal output circuit connected between the anode and cathode thereof and including said impedance, and at least one of said stages further comprising a signal-current diverting circuit including a capacitor connector between the anode and cathode of such stage.

11. The measuring circuit in accordance with claim 10 in which a source of direct current is connected in said series connection with said material and said alternating current source, said direct current source being poled for forward biasing the rectifying junction at the probe point closest in said series connection to said calibrated resistance means, and means for adjusting the magnitude of the output of said direct current source through a range which includes one half the peak-to-peak amplitude of the output current of said alternating current source.

12. A resistivity measuring circuit comprising a source of alternating potential having one terminal grounded, a body of material having an unknown resistivity, a calibrated resistance network, means connecting said material and said network in series between the terminals of said source, a voltage comparator for producing an output indication which is a function of the net input voltage applied thereto, means connecting first and second potential differences with respect to ground at first and second points on said unknown material to said comparator in opposite phases with respect to one another, and means coupling the potential difference across a portion of said calibrated resistance to said comparator in phase with the smaller one of said first and second potentials.

13. A resistivity measuring circuit comprising a source of alternating potential having one terminal thereof grounded, a body of semiconductor material having an unknown resistivity, calibrated variable resistance means connected in series with said material in a loop circuit which includes the terminals of said source, voltage combining means for receiving a plurality of voltages and providing an output indication which is a function of the combined magnitudes of said plurality of voltages, means simultaneously coupling to inputs of said combining means the voltages with respect to ground at a point on said resistance means and at two different points on said material, and said coupling means including means reversing the phase of the voltage at one of said two different points prior to application to said combining means.

14. A resistivity measuring circuit which comprises a material of unknown resistance, a source of alternating current having one terminal thereof grounded, calibrated resistance means, means connecting said calibrated resistance means and said material in series between the terminals of said alternating current source, voltage combining means for producing an output voltage which is a function of the net input potential applied thereto, means coupling the potentials with respect to ground at two points on said material to said combining means, said coupling means characterized by constriction resistances in the regions of engagement with said material which are much larger than the resistance of said material between said two points, adjustable capacitors connected between each of said points and ground for balancing the quadrature voltages in said coupling means, means coupling the potential difference across at least a portion of said calibrated resistance means to said combining means, and both of said coupling means having input impedances of sufficient magnitude so that substantially no current is diverted thereby from said series connection.

References Cited in the file of this patent

UNITED STATES PATENTS

| | | |
|---|---|---|
| 2,599,413 | Reichertz | June 3, 1952 |
| 2,802,172 | Mueller et al. | Aug. 6, 1957 |
| 2,871,445 | Carter et al. | Jan. 27, 1959 |

OTHER REFERENCES

"Apparatus for Measuring Resistivity and Hall Coefficient of Semiconductors," article in The Review of Scientific Instruments, July 1955; pages 660–664.

Bell Laboratories Record, August 1955; pages 308–312.

"Semiconductor Resistivity Test Set," Technical publication TP-104, Baird Associates, Inc., Cambridge, Mass.; February 1956.